United States Patent Office.

IMPROVED METHOD OF DEFECATING CANE JUICE.

LAWRENCE REID, OF NEW YORK, N. Y., AND DAVID LYMAN, OF MIDDLEFIELD, CONNECTICUT, ADMINISTRATOR OF THE ESTATE OF EDWARD H. SWIFT, DECEASED, ASSIGNORS TO PHINEAS L. ROBINSON AND JOSEPH H. PARSONS.

Letters Patent No. 60,244, dated December 4, 1866; antedated November 29, 1866.

SPECIFICATION.

TO ALL WHOM IT MAY CONCERN:

Be it known that we, LAWRENCE REID, of New York city, in the county and State of New York, and DAVID LYMAN, of Middlefield, in the county of Middlesex, in the State of Connecticut, administrator on the estate of EDWARD H. SWIFT, deceased, do hereby declare that the said REID and the said SWIFT were joint inventors of certain new and useful improvements in Defecating Sugar-Cane Juice, with the use of carbonic-acid gas; and we do hereby declare that the following is a full and exact description thereof.

This invention relates to the employment of carbonic-acid gas in connection with a weak alkali, so as to remove the impurities with little danger of injuring the juice. This carbonic-acid process consists of a cold and hot defecation. We shall proceed first to describe the cold defecation.

Into a tank containing seven hundred gallons of juice add nine pounds of slaked lime, previously mixed with water, and mix all well; then from a fountain or fountains containing water strongly impregnated with carbonic-acid gas allow that water to proceed slowly through a pipe about three-eighths of one inch in diameter, conducted to the bottom of said tank. The water and gas leave the fountain, owing to the pressure of the carbonic-acid gas upon the surface of the liquid contents of said fountain. We continue the acidification of the contents of the tank in this manner until litmus paper is turned slightly red by the excess of carbonic acid, when the impurities will be found to settle rapidly, leaving a clear liquor, showing that the defecation is completing. As soon as the liquor is clear it is drawn off into the boiler and heat applied, when any excess of carbonic-acid gas escapes. It still requires skimming, and the operation is complete. We can use cane juice instead of water to absorb the carbonic-acid gas in the fountain, if preferred.

The carbonic-acid gas for impregnating the water in the fountain may be prepared in the usual method for making soda water; that is, by the action of sulphuric acid (oil of vitriol) on ground marble or ground chalk and water, pumping the gas disengaged by such action by means of a force-pump into the fountains; or it may be made by the combustion of charcoal in close chambers, and pumping the gas arising from such combustion into the fountains containing water, as already described. We consider that this process may be further improved by the addition of one pound of a prepared slightly alkaline phosphate of lime, invented by the same parties, to promote crystallization and prevent acidity. The mode of preparation of this latter material by lime and superphosphate of lime, so as to be peculiarly adapted for this use, is described in detail in a patent granted to us of even date herewith.

We are aware that carbonic-acid gas has before been passed through juice defecated with lime, to free it from excess of lime; but owing, we believe, to the levity of the gas this process has hitherto been a failure. Now, by combining the gas previously with a liquid by pressure and operating in the mode herein described, we obtain a complete mixture of the carbonic-acid gas with the juice containing the lime, and the consequent neutralization and precipitation of the lime along with the defecated matters of the cane juice.

For the hot defecation of cane juice by carbonic-acid gas, we use the water impregnated with that gas in fountains, as already described, passing it down to the bottom of the boiler, and neutralizing the lime by the action of the carbonic acid, using litmus paper to indicate the excess of that body and that the lime is neutralized. We have not mentioned the proportion of lime, as we consider that different cane juices require different portions of lime; but we consider that an average proportion would be about five pounds slaked lime to the five hundred gallons of cane juice.

We esteem the defecating with the supercarbonates of lime and magnesia not as good as the operating with carbonic acid, as above described; but it may be preferred under some circumstances.

The liquid containing the gas is prepared in a manner similar to the preparation of the carbonic-acid water, as above described, with this difference: that for every nine gallons of water we place in the fountain one-half a pound of finely ground chalk—that is, carbonate of lime—or one-half pound of finely ground carbonate of magnesia. The fountains are then charged, as above described, with carbonic-acid gas.

In using the supercarbonates of lime and magnesia, or either of them, for defecating cane juice by the cold or hot process, we follow the same directions as given under the carbonic-acid water hot and cold process, as above described, using litmus paper to ascertain when the lime has been sufficiently neutralized.

We propose to use under some circumstances, on account of the varying nature of cane juice, in addition to carbonic acid, some one or more of the slightly acid bodies set forth as defecators in patents issued to us bearing even date herewith; but we do not believe such combination of processes to be generally expedient. When such are used the quantity of carbonic acid may be correspondingly diminished.

The varying nature of cane juice at different periods, and particularly on different estates, renders it desirable to vary the proportions of the materials considerably, which will be determined by the practical sugar boiler.

We obtain, as a general result, the production of from fifteen to thirty per cent. more sugar and of better quality than usual, and the saving to the estates of the cost and trouble in the use of bone-black, and, where vacuum pans are employed, producing a sugar equal to that produced by bone-black.

Having now fully described this invention, what we claim as new, and as the invention of the said LAWRENCE REID and EDWARD H. SWIFT, deceased, and desire to secure by Letters Patent, is as follows:

We claim defecating cane juice by lime and a liquid impregnated with carbonic-acid gas, in the manner above specified.

We also claim defecating cane juice by slaked lime and the supercarbonate of lime or magnesia, with carbonic-acid gas, applied as above described.

We also claim the combination, in the above-described process, of one or more of the other defecating agents set forth in patents issued to us of even date herewith, with a liquid containing carbonic-acid gas, with or without the supercarbonates of lime and magnesia, applied as herein specified.

LAWRENCE REID,
DAVID LYMAN.

Witnesses:
D. W. STETSON, } to L. R.
D. L. FREEBORN,
H. WOODWARD, } to D. L.
LYMAN A. MILLS, 60,244